Figure 1:
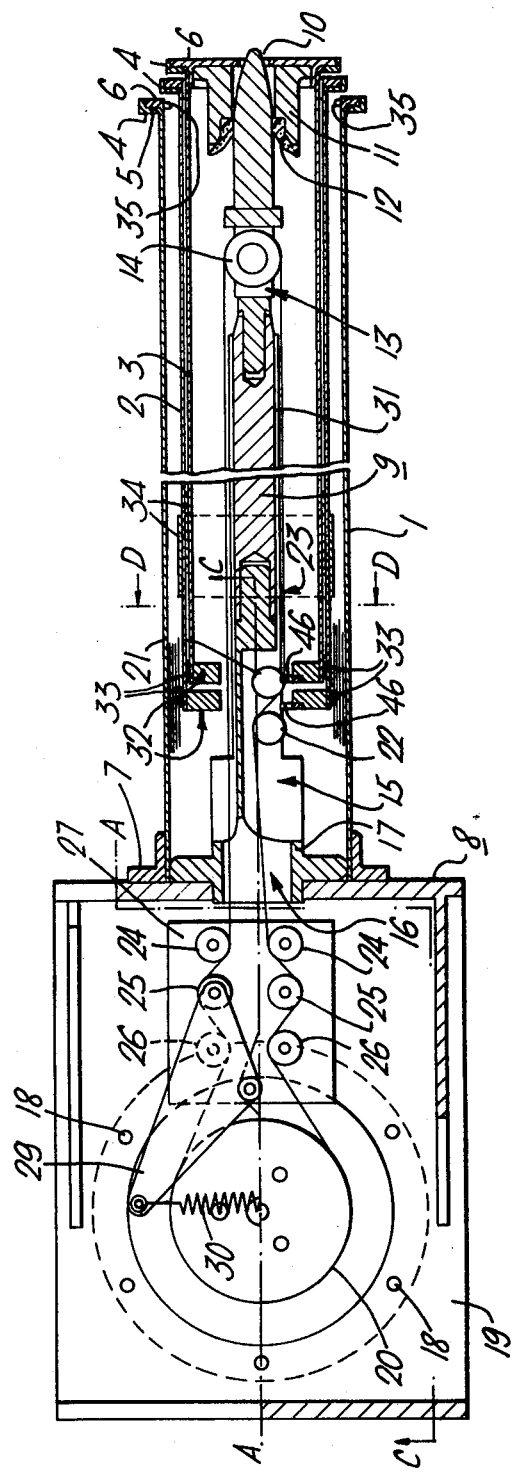

United States Patent [19]

Humphries

[11] 4,446,662
[45] May 8, 1984

[54] TELESCOPIC VARIABLE LENGTH DEVICE

[75] Inventor: Martin E. Humphries, Bristol, England

[73] Assignee: British Aerospace Public Limited Company, London, England

[21] Appl. No.: 252,191

[22] Filed: Apr. 8, 1981

[30] Foreign Application Priority Data

Apr. 11, 1980 [GB] United Kingdom ............... 8011952

[51] Int. Cl.³ .......................................... E04H 12/34
[52] U.S. Cl. .................................................. 52/121
[58] Field of Search ......................... 52/108, 115, 121

[56] References Cited

FOREIGN PATENT DOCUMENTS 726019  5/1980  U.S.S.R. ................................. 52/121

Primary Examiner—John E. Murtagh
Assistant Examiner—Kathryn L. Ford
Attorney, Agent, or Firm—Cushman, Darby & Cushman

[57] ABSTRACT

A telescopic boom especially for deploying a solar array on a spacecraft comprises, instead of the usual compressed gas extender means or the known threaded rod and nut combination, a flexible member extending in the longitudinal direction of the boom and movable in that direction to pick up and extend the tubular boom sections one after another in sequence. The member may be an endless sprocket chain driven by an electric motor and entrained around a wheel mounted at a forward end of a pillar which extends inside the boom to a position near the outer end of the unextended boom, the chain having regularly spaced increased thickness link-plates for engaging matching abutment surfaces of the tubular sections to extend them. As one section comes to its fully extended position, it shifts the next to a position in which it too will be engaged by the chain.

8 Claims, 5 Drawing Figures

TELESCOPIC VARIABLE LENGTH DEVICE

This invention relates to a telescopic variable-length device comprising a plurality of tubular sections nested one within another. By way of example, the device may be a carrier boom for deploying apparatus such as a solar cell array in a spacecraft.

It is known to extend such a carrier boom by admitting compressed gas to the interior of the boom so as to push the sections out one from within another. Also it has been proposed in patent specification No. 1512912 to provide, within such a boom, a rotatable partly screw-threaded rod upon which there are engaged a plurality of nuts secured to respective ones of the tubular sections. In the stowed position of the boom, only the first nut secured to the innermost tubular section is engaged with the threaded part of the rod while the others lie on a smooth part so that the rod can rotate freely within them. As the rod is rotated, the first nut is screwed along it so that the innermost tubular section moves to its extended position. Shortly before it reaches this position it becomes so engaged with the next larger section that this next larger section is carried along with it and the nut secured thereto becomes engaged with the threaded part of the rod. Thereupon, this next larger section is moved to its extended position and so on.

According to the present invention, there is provided a telescopic variable length device comprising a plurality of tubular sections and a mechanism including an elongate flexible member, for example, a sprocket chain, which extends in the longitudinal direction of the boom and is movable in the direction of its length, and which is operable while being so moved for engaging the tubular sections one after another in sequence to move them along with it.

Figure 2:
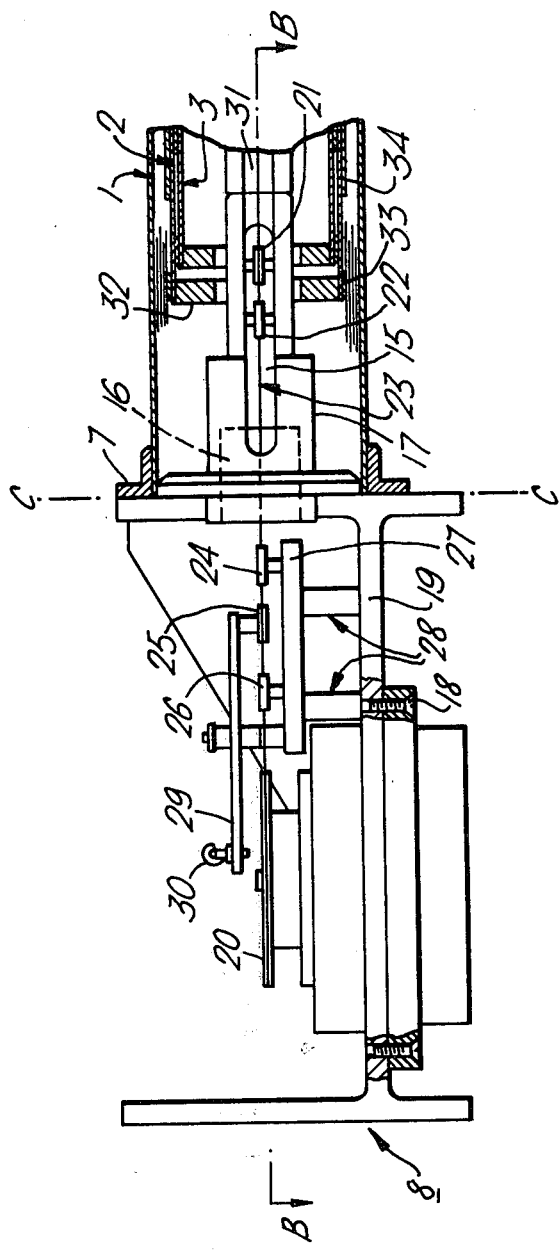
Figure 3:
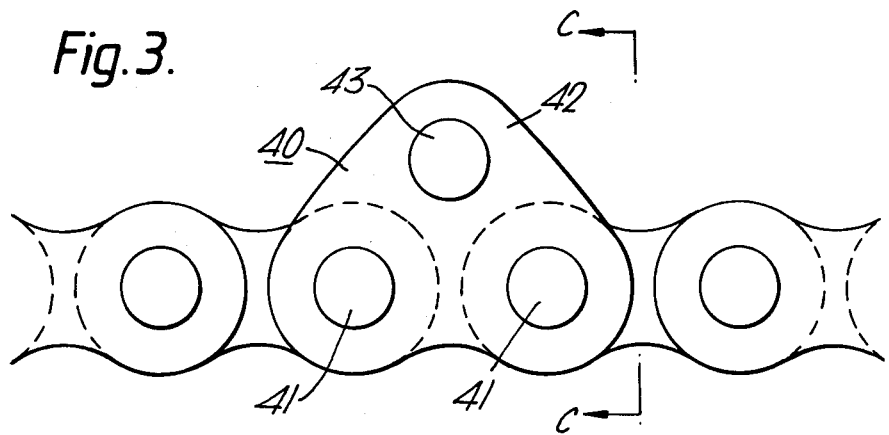
Figure 4:
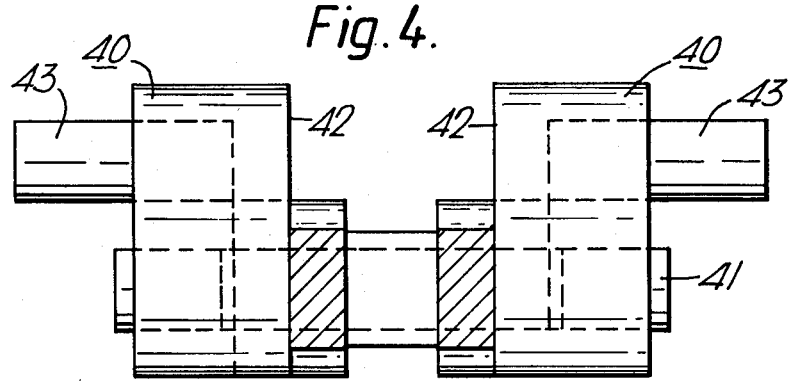
Figure 5:
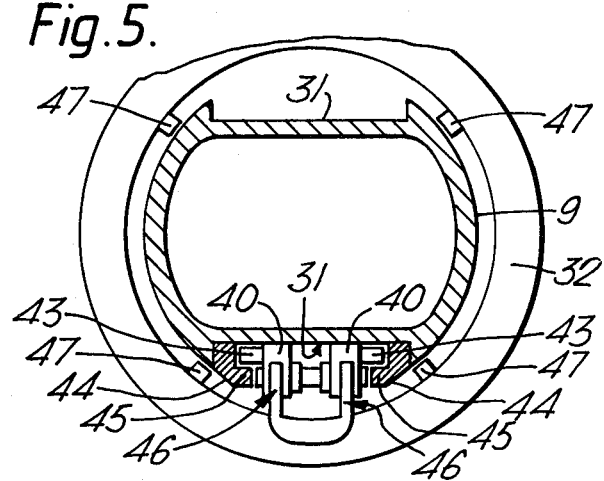

For a better understanding of the invention reference will now be made, by way of example, to the accompanying drawings in which:

FIG. 1 is a plan view of a telescopic boom, which view, below and to the right of the line AA, is sectioned on the line BB of FIG. 2, FIG. 2 is a partly sectioned elevation of part of the boom of FIG. 1, and FIG. 3 is a side view of part of a sprocket chain, FIG. 4 is a view on the line CC in FIG. 3, and FIG. 5 is a view on the line DD in FIG. 2.

The telescopic boom comprises a plurality of tubular sections which are nested one within another when the boom is retracted or "stowed" and of which, for clarity, only the outermost one, 1, and the innermost two, 2 and 3, are shown in FIGS. 1 and 2. Each tubular section comprises a light metal tube to the forward end of which, "forward" here referring to the direction in which the sections move while being extended, i.e. the right-hand side in FIG. 1, there is attached a forward end flange 4. Each flange 4 is made up of a shallow cup-shaped ring 5 and an annulus 6 which fits into the ring 5. The forward end of each tube is flared slightly and this flared end is clamped between the ring 5 and annulus 6 which are secured together by screws (not shown). The rear end of the outermost tubular section 1 is fixed into a flanged collar 7 which is attached, for example by screws (not shown) to one wall of a girder-shaped mounting member 8. The mounting member is in turn mounted in or upon a spacecraft (not shown). Affixed to the same wall of the member 8 so that it extends into and along the axis of the tubular sections of the boom, there is a pillar 9 which may be made up of a plurality of screwed together sections as shown so as to ease manufacture and enable the length of the pillar to be adjusted but which could also be made in one piece. Also, the pillar could be hollow to save weight. The forward end of the pillar comes to a rounded point 10 which is able to engage within a boss 11 affixed to the annulus 6 of the innermost tubular section. The boss 11 has a low friction plastics material insert 12 fitted therein to receive and guide the end of the pillar. A short distance behind its forward end, the pillar 9 is formed with a slot 13 wherein there is rotatably mounted a sprocket wheel 14. Near the rear end of the pillar there is a further slot 15 which extends back and merges with a hole 16 formed in the relatively wider diameter base part 17 of the pillar. Attached by screws 18 to the base wall 19 of the mounting member 8 there is an electric motor/gearbox unit to the output shaft of which is coupled a large sprocket wheel 20 so that it is in alignment with the sprocket wheel 14 near the forward end of the pillar 9. Within the slot 15 there are two further sprocket wheels 21 and 22 these being mounted one (22) behind the other (21) in the lengthwise direction of the pillar and such that one side of each just emerges from the slot 15. A continuous sprocket chain loop 23 is entrained around the sprocket wheel 14 and, from there, extends back along opposite sides of the pillar 9. On that side of the pillar, at which the slot 15 opens, i.e. the lower side in FIG. 1, the chain is entrained around the outer side of the sprocket 21 and then around the inner side of sprocket 22. On both sides, the chain then extends back through the hole 16 and then via a series of tensioning sprocket wheels to the large wheel 20. For clarity, in FIGS. 1 and 2, all the sprocket wheels are shown diagrammatically as smooth discs while the sprocket chain is drawn as a single line. The actual shape of the chain and wheels may be inferred from FIG. 3 which will be referred to later.

As shown in FIGS. 1 and 2, the aforementioned series of tensioning sprocket wheels consists of three such wheels 24, 25 and 26 for each side of the loop 23. The three wheels are positioned one behind the other having regard to the longitudinal direction of the boom and the outer two 24 and 26 in each case are mounted for rotation about respective fixed axes on a plate 27 which is supported above the wall 19 of the mounting member 8 upon columns 28 of the length such as to bring the sprocket wheels 24 and 26 into correct alignment with the wheels 14, 20, 21 and 22. Each side of the chain passes around the inner side, i.e. the side nearest the longitudinal axis of the boom, of the respective foremost tensioning wheel 24, then around the outer side of the respective central tensioning wheel 25 and then around the inner side of the respective rear tensioning wheel 26 before extending on to the sprocket wheel 20. Each wheel 25 is mounted at one corner of a respective triangular plate 29. The plates 29 are mounted for pivoting movement about a common axis on the plate 27 so as to form a caliper with a tension spring 30 extending between the plates 29 which spring acts so as to bias those corners of the plates 29 at which the respective sprockets 25 are mounted, and hence the sprockets 25 themselves, outwards away from each other and hence to tension the sprocket chain 23.

Each tubular section of the boom, apart from the outermost one 1, is provided with an inwardly extending flange 32 at its rear end, the flanges being such that all of them have the same inner diameter. Around the outside of the rear end of each of the tubular sections apart from the outermost one are arranged a plurality of bearing pads 33 which slidably engage the inner surface of the next larger tubular section in each case. Spaced forwardly from the pads 33, but still in the rear regions of the tubular sections, each of the inner sections is fitted with a sleeve 34 which has two forwardly extending lugs (not visible in the figures). The flanges 4 of each tubular section, apart from the innermost one, contain inwardly biassed spring latches 35 which, while the boom is stowed, engage in respective apertures formed in the next smaller tubular section in each case so as to lock the entire boom in the stowed position. When the boom is to be extended, the latches holding the innermost section 3 may be disengaged by any suitable means (not shown). Alternatively, the innermost section can be without the apertures in which the latches of the next larger section engage and can instead be held stowed by some other controllable means which is then released. Then, in the manner described later with reference to FIG. 3, the inner section is moved to its extended position. When the inner section 3 reaches its extended position, the spring latches mounted within the flange of the next larger section 2 become engaged in apertures in the lugs of the sleeve 34 of the innermost section 3 which thereby becomes interlocked with the section 2. At the same time, the sleeve 34 of section 3 engages the spring latches which are mounted in the flange of the tubular section which is next larger than the section 2 and which were previously holding the section 2 in its stowed position. As a result, the section is able to move to its extended position, become interlocked with the next larger section and, at the same time, release that next larger section for movement to its extended position. This sequence continues until the boom is fully deployed. The operation of the latches and the construction of the sleeves 34 and such are described more fully in our patent application to Meston U.S. application Ser. No. 237,946, filed on Feb. 25, 1981 based on U.K. No. 8006751 to which attention is directed.

The sprocket chain 23 has the usual series of links each comprising a pair of side-by-side figure eight-shaped plates and connected to each adjacent link by way of a respective hinge pin and a pair of side-plates which are also figure eight-shaped. At spaced intervals, however, the normal side-plates are replaced by modified ones 40 which are somewhat thicker, as shown in FIGS. 3 and 4, the corresponding hinge pins 41 being of extended length. Each modified side-plate has a generally triangular extension portion 42 which carries an outwardly extending guide pin 43.

As shown in FIG. 5, the central portion of the pillar, i.e between the slot 15 and the pillar part which carries the wheel 14, is circular in cross-section but with two flat-bottomed recesses 31 on opposite sides of the pillar and extending along its length. As mentioned earlier, the pillar may be hollow and it is shown like this in FIG. 5. At the sides of at least that one of the recesses which is at the lower side of the pillar in FIG. 1, there are fitted respective guide strips 44 which have portions 45 overhanging the floor of the recess to retain the guide pins 43 and hence to guide the sprocket chain and retain it close to the pillar 9. The guide strips 44 could be discarded if the recesses 31 are machined so as to form the overhanging portions 45 integral with the recess walls.

Each of the inwardly extending flanges 32 at the rear of the respective tubular sections is provided with two radially inwardly extending projections 46 which, as seen best in FIG. 5, lie adjacent respective sides of the sprocket chain (beneath the pillar 9 in FIG. 1). They are sufficiently spaced from the chain to enable the normal links and side plates to pass between them but the thicker side plates 40 are able to engage them so as to move them and the tubular section to which they are attached along to the extended position.

As seen best in FIG. 1, the sprocket chain is so guided by the wheels 21 and 22 that initially only the projections 46 of the innermost tubular section 3 are positioned so as to become engaged by the chain. Thus, when the boom is to be extended, the electric motor is operated so as to move the lower side of the chain loop forwardly in the direction towards the right-hand side of FIG. 1. Then the first link having the modified side plates 40 to reach the projections 46 of the tubular section 3 engages these projections and moves this section to its extended position. Just before this link reaches the sprocket wheel 14, the section 3 becomes interlocked with the next larger section 2 as described earlier and, as a result, the section 2 is moved forwardly so that the projections 46 of its flange 32 move into a position where they can be engaged by the next-to-arrive chain-link having the modified side-plates 40. At the same time, the projections 46 of the section 3 reach the wheel 14 and become disengaged from the chain. The chain now moves the section 2 to its extended position and so on until the boom is fully extended. The number and spacing of the links having the modified side plates are made such as to give as smooth a progression of the extension as possible. Ideally, one link will pick-up a particular tubular section just as the next preceding one comes to the position of disengagement, but clearly this is not essential and the number of links may be modified, e.g. to give even spacing thereof.

The inner surface of each flange 32 is provided with a series of bearing pads 47, made of Nylatron (trade name) or P.T.F.E., for example, which extend to a short distance from the surface of the pillar 9 and assist in counteracting tendency of the pillar and the structure as a whole to bend in the face of the various forces to which they are subjected both normally and while the boom is being extended.

It will be realised that the boom could be modified so that the mechanism which extends it can equally well retract it if it should be desired to make a recoverable spacecraft. For this no particular modification of the sprocket chain and such is needed. However, there does have to be provided some means (not shown) for disengaging the spring latches 35 which hold the tubular sections interlocked one with another when the boom is extended. By way of example, a series of cams could be arranged to push the spring latches 35 out of engagement with each section as that section is retracted. Alternatively, the illustrated interlocking system using the spring latches 35 could be replaced by some disengageable interlocking means.

I claim:
1. A telescopic boom comprising:
   a support member,
   a first elongate tubular boom section connected to said support member, and
   a plurality of further elongate tubular boom sections,
   said boom sections being at least partially nested one inside another when the boom is in a non-extended position and said further boom sections being movable relative to one another and to said first boom section in the longitudinal direction of the sections for the boom to move between said non-extended position and an extended position thereof, the boom further comprising a drive mechanism for moving the boom sections as aforesaid which drive mechanism includes:

an elongate flexible element, support means fixed with respect to said support member and operable for supporting said flexible element so that it extends in said longitudinal direction near said first boom section and so that said flexible element is movable in the direction of its length, and motor means coupled to the flexible element and operable for moving the flexible element in the direction of its length as aforesaid, said further boom sections comprising respective engagement portions operable in sequence for engaging a cooperating engagement portion of said flexible member and for being moved by the flexible member to extend the associated further boom sections in corresponding sequence.

2. A telescopic boom according to claim 1, wherein said elongate flexible element is endless and said support means defines an elongate looped path for the flexible element with one side of the looped path extending in said longitudinal direction near said first boom section.

3. A telescopic boom according to claim 2, wherein said looped path includes a take-up region and set-down region near which the flexible element respectively engages and disengages the engagement portion of each further boom section.

4. A telescopic boom according to claim 3, wherein each further boom section comprises coupling means which, as the engagement portion of the boom section approaches said set-down region, becomes operable for engaging the next boom section to be moved in said sequence and for thereby moving said next boom section so that the engagement portion thereof moves to said take-up region and is subsequently engaged by the flexible element.

5. A telescopic boom comprising:

a support member, an outermost elongate tubular boom section one end of which is fixed to said support member, a plurality of further elongate tubular boom sections which, in a non-extended position of the boom, are at least partially nested one within another and within said outer boom section, each further boom section being extendable in the direction of its length with respect to the next outer section within which it is nested and each further boom section comprising, near its innermost end, an inwardly extending abutment portion and coupling means, the coupling means being operable, as the boom section approaches its extended position with respect to said next outer boom section, to engage cooperating coupling means of that next outer section and fix the two boom sections with respect to one another, an elongate flexible element having at least one projecting abutment, guide means fixed to said support member and operable to support and guide said flexible element for movement in the direction of its length along a path which, near a take-up region within the outermost boom section, turns to bring the flexible element to a position for the projecting abutment thereof to engage the inwardly extending abutment portion of a further boom section, which then extends along towards the outer end of the outermost boom section for the flexible element to extend the engaged boom section, and which at a set-down region turns again to bring the flexible element to a position for said projecting abutment thereof to become disengaged from said inwardly extending abutment portion, said set down region being positioned such that, prior to said disengagement, the boom section being extended and the next outer further boom section, if any, become fixed together by said coupling means whereupon further movement of the flexible element extends that next outer further boom section to bring the inwardly extending abutment thereof to said take-up region.

6. A telescopic boom according to claim 5, wherein said flexible element comprises a plurality of projecting abutments at spaced intervals along its length.

7. A telescopic boom according to claim 5, wherein said guide means includes an elongate rod extending along the longitudinal axis of the boom sections, at least some of said sections including bearing means adapted to bear on the rod.

8. A telescopic boom according to claim 5, wherein said flexible element comprises a sprocket chain.

* * * * *